United States Patent [19]

Beard et al.

[11] Patent Number: 5,247,877
[45] Date of Patent: Sep. 28, 1993

[54] AUTOMATIC BARBECUE GRILL

[75] Inventors: John E. Beard, Chassell, Mich.; Mehdy Sabbaghian, Baton Rouge, La.

[73] Assignee: Board of Supervisors of Louisiana State University and Agricultural and Mechanical College, Baton Rouge, La.

[21] Appl. No.: 821,635

[22] Filed: Jan. 16, 1992

[51] Int. Cl.⁵ .................................... A47J 37/06
[52] U.S. Cl. .......................... 99/446; 99/392; 99/399; 99/400; 126/41 D; 126/41 E; 312/325
[58] Field of Search ................. 99/345, 349, 351, 353, 99/417, 419, 421 R, 427, 423, 446; 126/41 R, 25 R, 29, 30, 9 R, 41 E, 41 D; 312/325, 327, 332.1

[56] References Cited

U.S. PATENT DOCUMENTS

| | | | |
|---|---|---|---|
| 1,722,237 | 7/1929 | Shroyer | 126/41 E |
| 2,008,222 | 7/1935 | Pape | 126/41 E |
| 2,106,506 | 1/1938 | Pletcher et al. | 126/41 E |
| 2,119,898 | 6/1938 | Weston | 126/41 E |
| 2,265,421 | 12/1941 | Donnelly | 126/41 E |
| 2,434,592 | 1/1948 | Schneider | 126/19 |
| 2,734,499 | 2/1956 | Lombardi | 99/446 |
| 3,596,591 | 8/1971 | Spates | 99/392 |
| 3,824,916 | 7/1974 | Green et al. | 99/446 |
| 4,144,870 | 3/1979 | Reynolds | 126/41 E |
| 4,628,897 | 12/1986 | Stanfa et al. | 126/41 R |
| 4,840,118 | 6/1989 | Rinehart | 99/446 |

FOREIGN PATENT DOCUMENTS 118541   5/1988   Japan ................................ 126/41 D Primary Examiner—Harvey C. Hornsby
Assistant Examiner—Patrick F. Brinson
Attorney, Agent, or Firm—John H. Runnels

[57] ABSTRACT

A novel barbecue grill with mechanical linkages which automatically perform the following functions when the user pulls a single handle: (1) the lid opens; (2) the grill surface moves out of the grill; (3) a drip pan may optionally travel under the grill surface to catch drippings; and (4) the lid closes after the grill surface is out of the grill. The user then has access to the grill surface while the lid to the grill remains closed. Pushing on the handle reverses the sequence of events. An optional feature permits the user to lift the lid in the conventional manual manner, independently of the position of the grill surface. An optional safety feature inhibits the motion of the grill surface when the lid has been lifted manually, thus preventing the lid from accidentally slamming closed after it has been opened in the conventional manual manner.

6 Claims, 6 Drawing Sheets

AUTOMATIC BARBECUE GRILL

This invention pertains to barbecue grills, particularly to barbecue grills allowing the user easy and convenient access to the food being grilled.

Barbecue grills are well known. Use of a lid to contain heat and smoke within a barbecue grill is also well known. Existing grills with lids have several disadvantages. It is necessary for the user to have access to the grill surface for many reasons, such as placing food on the surface, basting food which is on the surface, moving food from one part of the surface to another, fuming food over, checking food for doneness, or removing food from the surface. Lifting the lid permits the user to have access to the grill surface, but frequently results in loss of heat, or results in heat and smoke in the user's face, and may contribute to the danger of burning the user; the smoke thereby escaping may also contribute to air pollution. Manually lifting the grill surface out of the grill and replacing the lid, and then later returning the grill surface manually is an impractical solution, and may be difficult or dangerous with hot, heavy items on a hot grill surface.

U.S. Pat. No. 4,840,118 discloses a grill in which a food-supporting rack may be pulled out horizontally through an opening in the housing onto a drip pan. The foodsupporting rack includes a relatively large plate on one side to close the opening in the housing when the rack is pulled outwardly.

U.S. Pat. Nos. 4,628,897 and 3,596,591 disclose a broiler in which a rack is linked to a door on a front, vertical surface of the broiler in a manner such that opening and closing the door causes the rack to be pulled out of and pushed into the broiler cabinet. The grill remains open when the door pulls the rack out, allowing smoke and heat to escape.

U.S. Pat. No. 2,434,592 discloses an oven with a pan having a self-raising lid. When the door of the oven is opened, the framework supporting the pan may be slid out, causing a lid on the pan to open. The door to the oven remains open, allowing heat to escape.

A novel barbecue grill has been invented with mechanical linkages which automatically perform the following functions when the user pulls a single handle: (1) the lid opens; (2) the grill surface moves out of the grill; (3) a drip pan may optionally travel under the grill surface to catch drippings; and (4) the lid closes after the grill surface is out of the grill. The user then has access to the grill surface while the lid to the grill remains closed. Pushing on the handle reverses the sequence of events. An optional feature permits the user to lift the lid in the conventional manual manner, independently of the position of the grill surface. An optional safety feature inhibits the motion of the grill surface when the lid has been lifted manually, thus preventing the lid from accidentally slamming closed after it has been opened in the conventional manual manner.

Most of the operating mechanisms are located outside the grill to reduce oxidation and corrosion promoted by high heat and humidity inside the grill. The lid can be opened manually as in a conventional barbecue grill, or it can optionally be operated automatically through the linkage mechanism of the present invention.

In one embodiment of this invention, the grill was modified from a commercially available Kenmore Grill Model 10291, although the principles involved could easily be used to modify many other types of commercially available barbecue grills, or to construct a completely new grill from basic starting materials.

Figure 1:
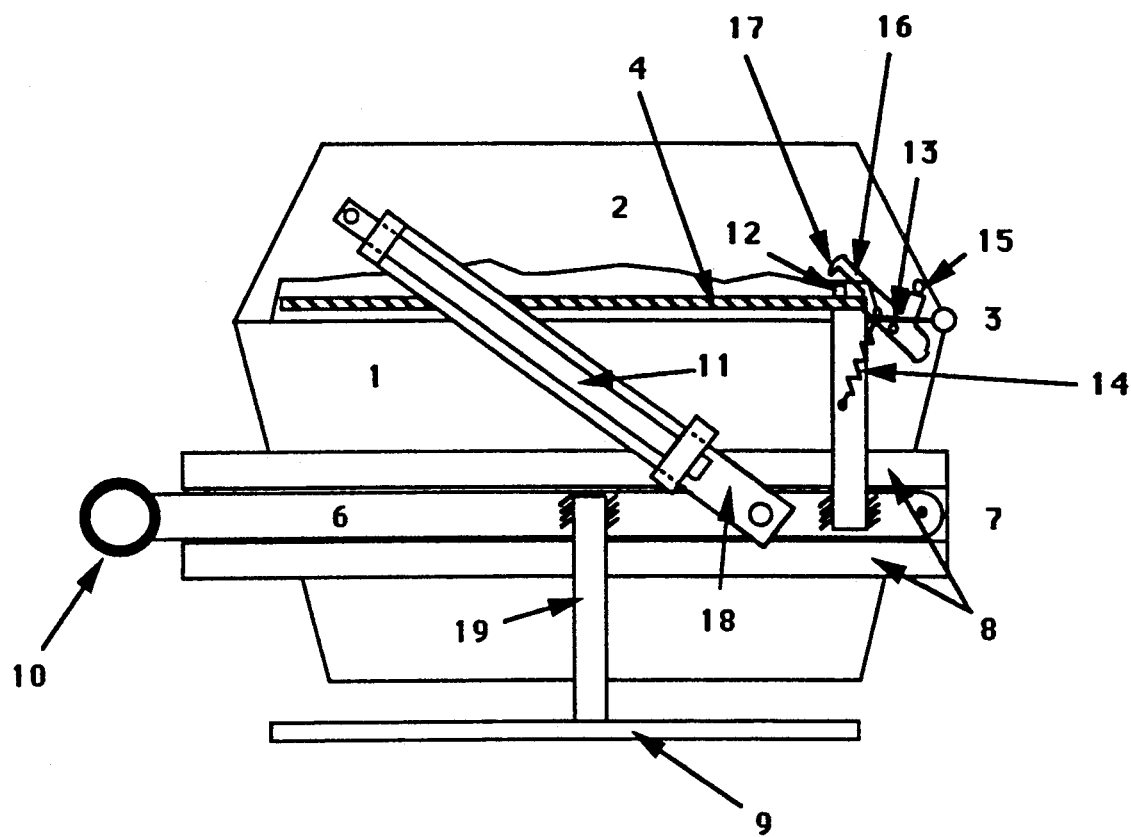
FIG. 1 illustrates the barbecue grill in the closed position, with the grill surface inside.

Referring to FIG. 1, in the closed position, base 1 of the grill was attached to lid 2 at joint 3. Grill surface 4, inside base 1, was attached to rods 5, which in turn were attached to the sliding portions 6 of sliding linkages 7. Sliding linkages 7 were commercially available Quantum System 3450 heavy duty, full extension, ball suspension, drawer slides from Waterloo Metal Stampings Ltd. of Kitchener, Ontario, Canada. The stationary portions 8 of sliding linkages 7 were attached to base 1. Drip pan 9 was attached to rods 19. Handle 10 was attached to sliding portions 6. Extendable links 11 and 18 were pivotally attached near the front of lid 2, and also near the rear of sliding portions 6. Safety latches 16 were attached to base 1 with pivots 13 and springs 14. Pegs 15 were attached to lid 2. When lid 2 was closed, pegs 15 pressed down on latches 16, causing latches 16 to pivot around pivots 13, until latches 16 disengaged from stoppers 12, and the front hooks 17 of latches 16 were not in contact with stoppers 12.

Figure 2:
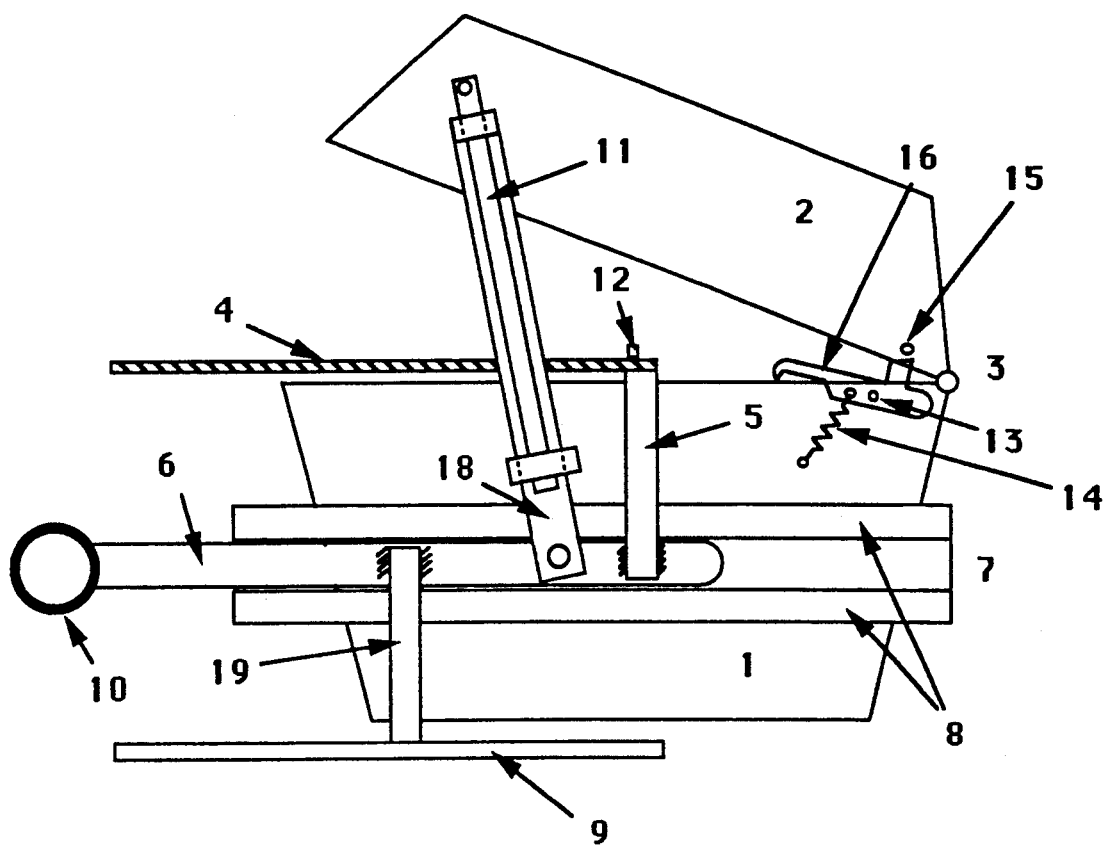
FIG. 2 illustrates the barbecue grill in a partially open position as the grill surface is withdrawn.
Figure 3:
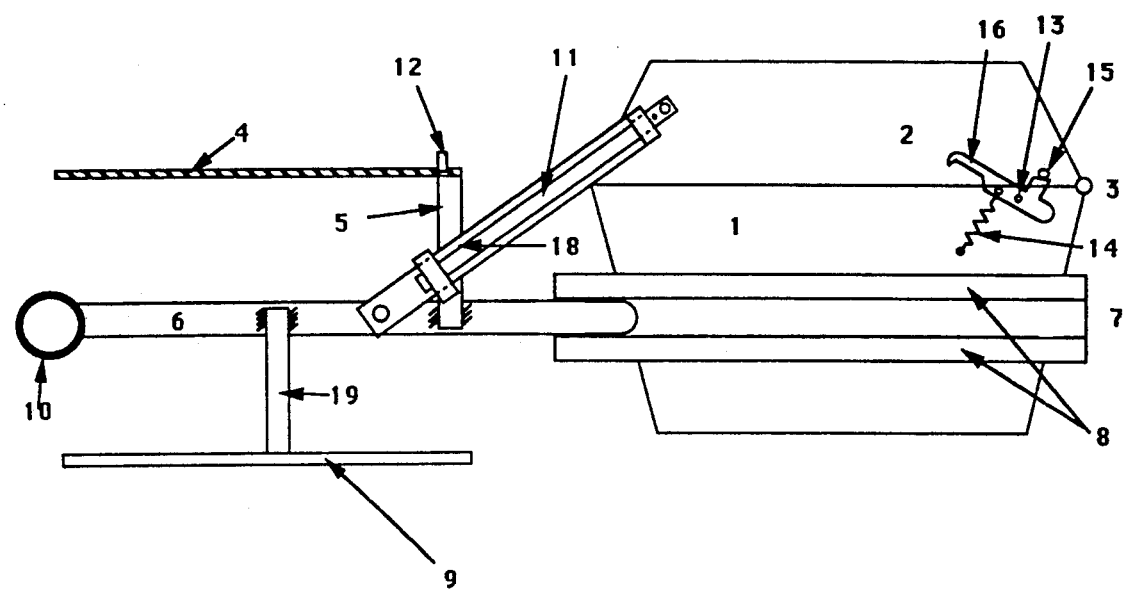
FIG. 3 illustrates the barbecue grill in the closed position, with the grill surface fully withdrawn.

Referring to FIGS. 2 and 3, to open the grill automatically, remove the grill surface 4, and close the grill, a force was applied to handle 10 in the direction away from the grill. This force caused sliding portions 6 to move in tandem with handle 10, carrying with them rods 5, and grill surface 4; stoppers 12 passed under hooks 17 without touching hooks 17. The motion of sliding portions 6 in the direction of handle 10 caused the portions of extendable links 11 and 18 attached to sliding portions 6 to move in tandem as a unit, thereby causing extendable links 11 and 18 to move first to a vertical position, thereby lifting lid 2 and permitting grill surface 4 and any food on grill surface 4 to pass outside the grill. As sliding portions 6 continued to move out, extendable links 11 and 18 moved back down from the vertical position, thereby closing lid 2. Extendable links 11 and 18 were stationary relative to one another throughout this motion, and therefore remained essentially rigid. Drip pan 9, being attached to rods 19, remained under grill surface 4 at all times, thereby catching any drippings from any portion of grill surface 4 which was outside the grill. To bring grill surface 4 back into the grill and close the grill automatically, a force was applied to handle 10 in the direction towards the grill, and afl the movements described in this paragraph were reversed, until grill surface 4 and the food were inside the grill, and lid 2 was closed.

Figure 4:
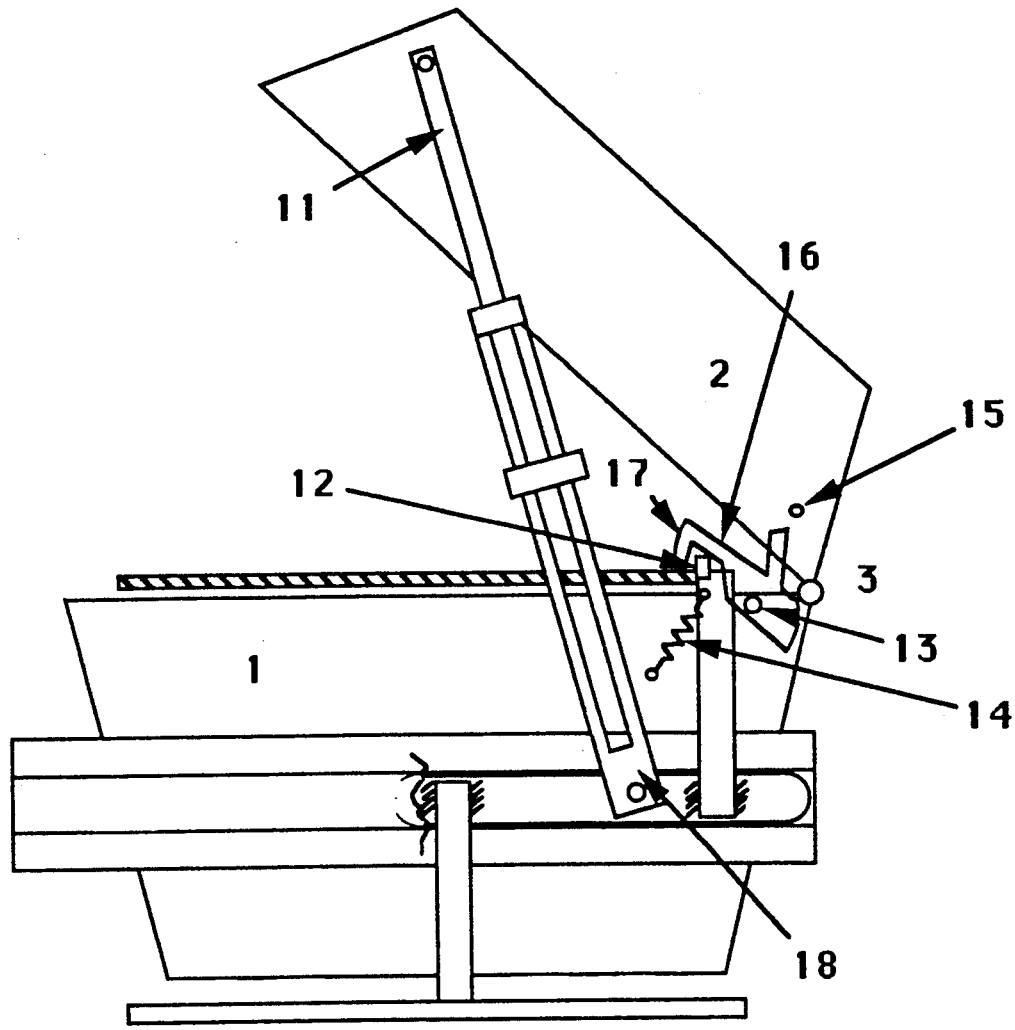
FIG. 4 illustrates the barbecue grill partially opened in the conventional manner.
Figure 5:
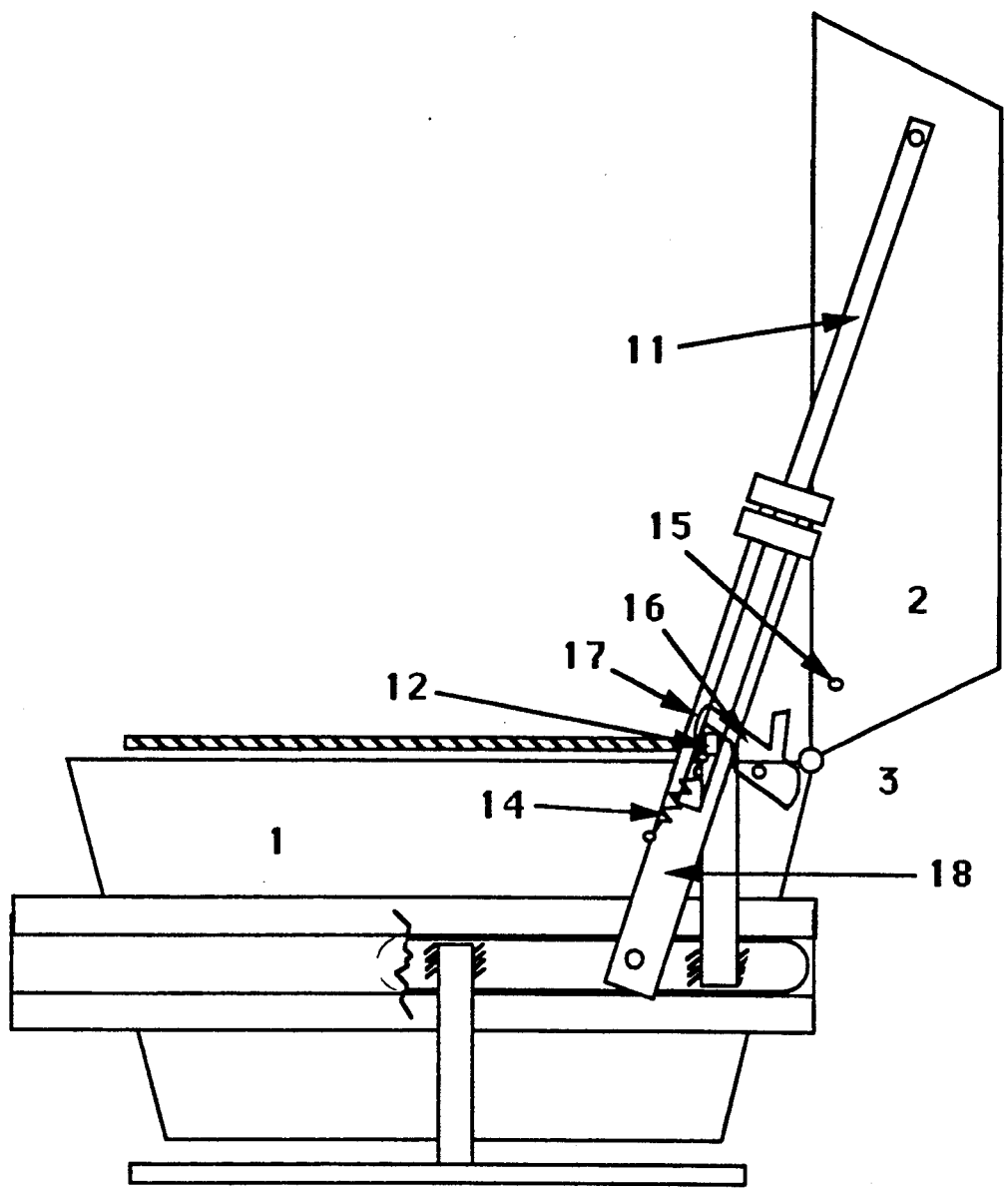
FIG. 5 illustrates the barbecue grill fully opened in the conventional manner.
Figure 6:
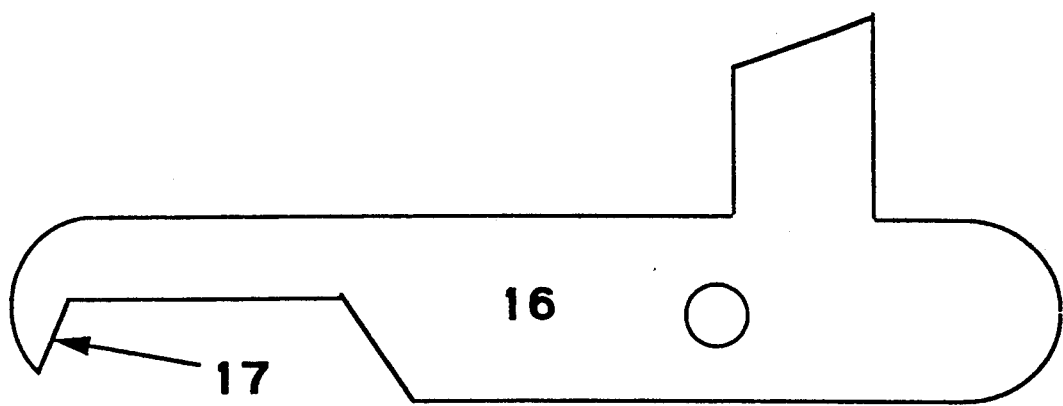
FIG. 6 illustrates the safety latch used in the preferred embodiment of this invention.

Referring to FIGS. 4 and 5, to open the grill in the conventional, manual mode, lid 2 was lifted, causing extendable links 11 to extend from links 18, and to pivot as lid 2 opened. When lid 2 opened, pegs 15 no longer pushed on latches 16, so the action of gravity or of spring 14 pulled latches 16 down, causing hooks 17 to engage stoppers 12. When stoppers 12 were thus engaged, handle 10 could not be pulled forward, thus preventing grill surface 4 from moving out of base 1 when lid 2 is opened in the manual mode.

We claim:

1. A barbecue rill comprising:
   (a) a base;
   (b) a lid movably resting on said base, which together with said base form an enclosed space between said lid and said base when said lid rests on said base;
   (c) a grill surface removably located in the enclosed space between said lid and said base;
   (d) means for removing said surface out from the enclosed space between said lid and said base;
   (e) means for reversibly lifting said lid from said base; and
   (f) means for coupling said removing means and said lifting means, such that operating said removing means causes said lifting means first to lift said lid to permit said surface to exit the enclosed space, and second to lower and replace said lid on said base after said surface has exited the enclosed space.

2. A barbecue grill as recited in claim 1, additionally comprising:
   (a) means for catching material falling from said surface;
   (b) means for translating said catching means; and
   (c) means for coupling said removing means and said translating means, such that a portion of said catching means is under any portion of said surface which is outside the enclosed space.

3. A barbecue grill as recited in claim 2, wherein said catching means comprises a drip pan, and wherein said coupling means comprises a member attached both to said drip pan and to said grill surface.

4. A barbecue grill as recited in claim 1, wherein:
   (a) said removing means comprises a sliding linkage attached both to said surface and to a handle, such that moving said handle away from said base moves said surface from the enclosed space between said lid and said base, and moving said handle toward said base moves said surface into the enclosed space between said lid and said base; and
   (b) said lifting means comprises a link pivotally attached both to said lid and to said sliding linkage, such that said lid rests on said base when said handle is in the position closest to said base; and such that as said handle and said sliding linkage move from said base, said link pivots about said sliding linkage and said lid, lifting said lid; and such that as said handle moves to a position farther from said base, the continued pivoting of said link about said sliding linkage and said lid lowers said lid until said lid rests on said base.

5. A barbecue grill as recited in claim 1, wherein said lifting means may be operated independently of said removing means, whereby said lid may be reversibly lifted without substantially moving said surface.

6. A barbecue grill as recited in claim 5, wherein:
   (a) said removing means comprises a sliding linkage attached both to said surface and to a handle, such that moving said handle away from said base moves said surface from the enclosed space between said lid and said base, and moving said handle toward said base moves said surface into the enclosed space between said lid and said base; and
   (b) said lifting means comprises an extendable link pivotally attached both to said lid and to said sliding linkage, such that said lid rests on said base when said handle is in the position closest to said base; and such that as said handle moves from said base, said extendable link pivots about said sliding linkage and said lid, lifting said lid; and such that as said handle moves to a position farther from said base, the continued pivoting of said extendable link about said sliding linkage and said lid lowers said lid until said lid rests on said base; and such that said extendable link permits the lifting of said lid independently of the position or motion of said handle or said surface.

* * * * *